(12) United States Patent
Munechika et al.

(10) Patent No.: US 9,030,516 B2
(45) Date of Patent: May 12, 2015

(54) PRINTER NONUNIFORMITY COMPENSATION FOR HALFTONE SCREENS

(75) Inventors: Stacy M. Munechika, Fairport, NY (US); Chung-Hui Kuo, Fairport, NY (US); Hwai-Tzuu Tai, Rochester, NY (US); Stephen J. Famand, Fairport, NY (US)

(73) Assignee: Eastman Kodak Company, Rochester, NY (US)

( * ) Notice: Subject to any disclaimer, the term of this patent is extended or adjusted under 35 U.S.C. 154(b) by 983 days.

(21) Appl. No.: 13/166,033

(22) Filed: Jun. 22, 2011

(65) Prior Publication Data

US 2012/0268544 A1 Oct. 25, 2012

Related U.S. Application Data

(60) Provisional application No. 61/477,767, filed on Apr. 21, 2011.

(51) Int. Cl.
| | | |
|---|---|---|
| *B41J 2/385* | (2006.01) | |
| *G03G 13/04* | (2006.01) | |
| *G03G 15/043* | (2006.01) | |
| *H04N 1/401* | (2006.01) | |
| *H04N 1/405* | (2006.01) | |
| *H04N 1/407* | (2006.01) | |
| *G06K 15/02* | (2006.01) | |
| *G06K 15/12* | (2006.01) | |

(52) U.S. Cl.
CPC .......... *G03G 15/043* (2013.01); *H04N 1/4015* (2013.01); *H04N 1/405* (2013.01); *H04N 1/407* (2013.01); *G06K 15/1881* (2013.01); *G06K 15/1209* (2013.01); *G06K 15/1247* (2013.01); *G06K 15/1868* (2013.01)

(58) Field of Classification Search
None
See application file for complete search history.

(56) References Cited

U.S. PATENT DOCUMENTS

| | | | |
|---|---|---|---|
| 5,546,165 A | 8/1996 | Rushing | |
| 5,666,150 A | 9/1997 | Ajewole | |
| 5,704,021 A | 12/1997 | Smith et al. | |
| 5,818,501 A * | 10/1998 | Ng et al. | 347/240 |
| 6,542,173 B1 * | 4/2003 | Buckley | 715/841 |
| 6,608,641 B1 | 8/2003 | Alexandrovich et al. | |
| 6,819,352 B2 | 11/2004 | Mizes et al. | |
| 6,917,448 B2 | 7/2005 | Koifman et al. | |
| 7,095,531 B2 | 8/2006 | Mizes et al. | |
| 7,125,094 B2 | 10/2006 | Mizes | |
| 7,929,177 B2 * | 4/2011 | Inoue et al. | 358/1.8 |
| 2006/0001911 A1 | 1/2006 | Viassolo et al. | |
| 2006/0133870 A1 | 6/2006 | Ng et al. | |
| 2007/0024912 A1 * | 2/2007 | Inoue et al. | 358/3.06 |
| 2010/0097657 A1 | 4/2010 | Kuo et al. | |

* cited by examiner

*Primary Examiner* — Uyen Chau N Le
*Assistant Examiner* — John M Bedtelyon
(74) *Attorney, Agent, or Firm* — Kevin E. Spaulding

(57) ABSTRACT

Compensation is performed for nonuniformity in a printer. The printer has a photoreceptor and a print head with a plurality of different light sources, each light source capable of producing a plurality of different levels of light. A plurality of stored gain control signals for each light source are related to the light output of that light source. Print job data includes screened pixel levels and a halftone screen specification. The stored gain control signals are adjusted based on the halftone screen specification. The screened pixel levels are modified using the adjusted gain control signals to provide engine pixel levels. Those levels are provided to corresponding light sources to expose the photoreceptor in respective pixel areas with light corresponding to the compensated pixel levels.

4 Claims, 9 Drawing Sheets

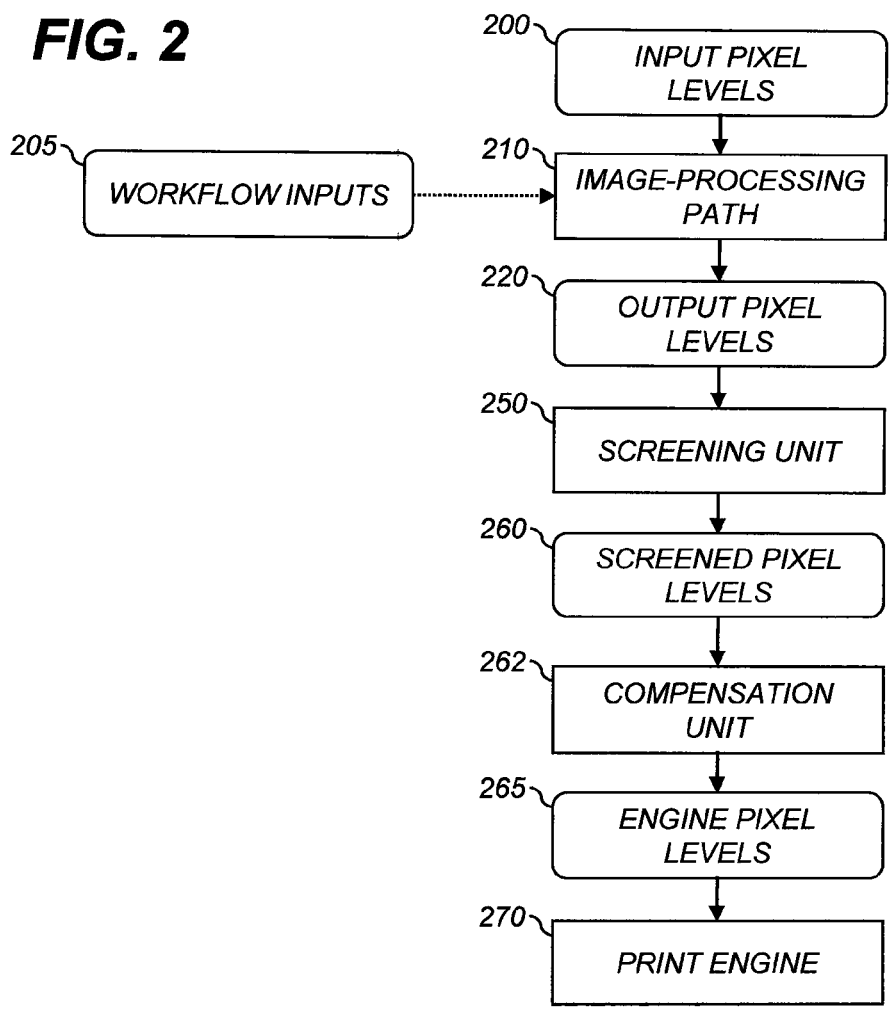
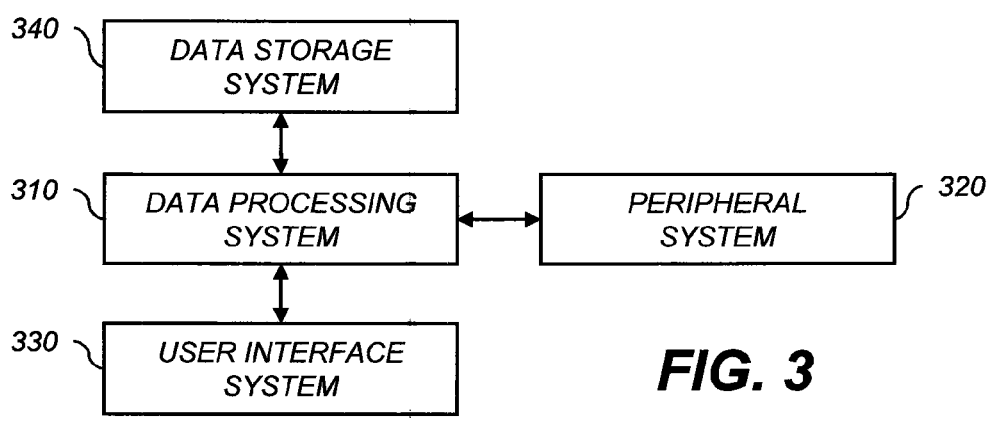

PRINTER NONUNIFORMITY COMPENSATION FOR HALFTONE SCREENS

CROSS REFERENCE TO RELATED APPLICATIONS

Reference is made to commonly-assigned U.S. patent application Ser. No. 12/577,233, filed Oct. 12, 2009, entitled "ADAPTIVE EXPOSURE PRINTING AND PRINTING SYSTEM" to Chung-Hui Kuo, et al., U.S. Patent Application Ser. No. 61/477,767, filed Apr. 21, 2011, entitled "ELECTROPHOTOGRAPHIC PRINTING WITH COMPENSATION" to Chung-Hui Kuo, et al., and U.S. patent application Ser. No. 12/635,040, filed Dec. 10, 2009, entitled "AUTOMATIC HIGH-PRECISION REGISTRATION CORRECTION SYSTEM WITH LOW-RESOLUTION IMAGING" to Chung-Hui Kuo, et al., the disclosures of all of which are all incorporated by reference herein.

FIELD OF THE INVENTION

The present invention relates to halftone screening using a print head with adjustable light sources and more particularly to providing adjustments to correct for printer variations.

BACKGROUND OF THE INVENTION

Printers are useful for producing printed images of a wide range of types. Printers print on receivers (or "imaging substrates"), such as pieces or sheets of paper or other planar media, glass, fabric, metal, or other objects. Printers typically operate using subtractive color: a substantially reflective receiver is overcoated image-wise with cyan (C), magenta (M), yellow (Y), black (K), and other colorants. Various schemes can be used to process images to be printed.

Printers with optical printheads expose engine pixels, specific areas on a photosensitive receiver, with specific engine pixel levels to form an image. However, printers can produce images exhibiting nonuniformity in the cross-track (X) and in-track (Y) directions. Visible nonuniformities that extend along the in-track direction are referred to herein as "streaks," and nonuniformities that extend along the cross-track direction are referred to as "bands." Nonuniformity in various printer systems can cause streaks and bands. For example, differences between the output powers of adjacent LEDs in an exposure system can cause streaks, and eccentricity of rollers in toning stations can cause bands.

In halftoned or multitoned screening, multiple adjacent engine pixels are grouped into a screen cell. In binary halftoning, each engine pixel is either exposed or not, and colorant is applied to the exposed pixels to form the image. The density of the halftone dot is therefore proportional to the number of engine pixels exposed in the screen cell. Multitoned systems, in contrast, provide more than two levels of exposure for each engine pixel. For example, an eight-bit system provides an unexposed level, or one of 255 progressively-increasing levels of exposure, which correspond to 256 possible density levels of each engine pixel. The number of engine pixels exposed in the screen cell for a given density level, and the individual exposures of those pixels, are selected to produce a pleasing tonescale in a multitoned image.

Various schemes exist for providing compensation for one-dimensional macro non-uniformity, referred to herein as streaking (extending in-track) or banding (extending cross-track). For example, U.S. Pat. No. 6,819,352 to Mizes et al. describes printing a test target, scanning it, determining nonuniformities, and adjusting drive current of an LED to compensate. U.S. Patent Publication No. 20060001911 by Viassolo et al. describes a method for compensating for streak defects in an image formed using a raster output scanning device by adjusting the intensity of exposure. This scheme includes generating a reflectance profile from an image generated by the raster output scanning device; determining a difference profile based upon the generated reflectance profile and a uniform profile; and generating a compensation parameter based on the determined difference profile, the compensation parameter representing a change in an intensity setting profile for the raster output scanning device.

SUMMARY OF THE INVENTION

Each binary or multi-level halftone screen is designed with a particular screen frequency (lines per inch), screen cell layout (number and arrangement of engine pixels in a cell), and sequence of engine pixel levels (exposures) to produce desired densities. Different screens can produce the same densities but have differences in the sensitivity of tonal response to individual pixel exposure changes. For example, different dot shapes have different dot gains, so extra or insufficient colorant will affect the density to a different extent depending on dot shape.

Additionally, a print job, i.e., a set of job data to be reproduced onto one or more pages of output, can include multiple types of content. An example of a job is a page of a newspaper, which contains text, halftoned photographs, and line-art or other graphics. Various techniques are used to process different content types within a single job, and any given printer is generally designed to produce higher-quality output for some types of content than for others.

Prior systems print a target with a particular halftone, scan the target, and use the resulting data to print images with same screen that was used for the test target. However, the effectiveness of using the exposure to compensate for various nonuniformities can be compromised if the proper amount of gain is not considered as a function of the halftone screen response for different halftone screens.

In an example, a line screen, a screen having a linear dot structure, is produced by a fixed-position LED array. A 90°-screen-angle line screen has lines extending in the in-track direction. A 0°-screen-angle line screen has lines extending in the cross-track direction. LEDs generally do not produce perfectly circular light cones or expose perfectly circular areas on a photoreceptor, so there is some X and Y variation in the LED exposure areas of different LEDs. In the 90° line screen, individual exposed areas on the photoreceptor overlap in the Y direction, so only the X variation of the LED exposure area contributes significantly to nonuniformity (in this example). In the 0° line screen, the exposed areas overlap in the X direction, so only the Y variation of exposure area contributes to nonuniformity. As a result, printed images of the same targets, on the same printer, but with different screen angles (0° or 90°) will exhibit different nonuniformity, and correction for the nonuniformities evident in the 0° screen will not compensate for the nonuniformities evident when using the 90° screen.

The difference between screen sensitivities is particularly significant when a job includes multiple screen types. Using compensation data intended for a particular screen type when compensating other screen types can result in incomplete compensation or overcompensation. In addition, the streaking or banding artifacts can be density dependent and require different compensation to provide acceptable image quality.

According to an aspect of the present invention, therefore, there is provided a method of compensating for nonuniformity in a printer, comprising:

providing the printer having a photoreceptor and a print head with a plurality of different light sources, each light source capable of producing a plurality of different levels of light;

providing a plurality of stored gain control signals for each light source based upon the light output of that light source;

receiving data for a print job, the data including screened pixel levels and a halftone screen specification;

adjusting the stored gain control signals based on the halftone screen specification;

modifying the screened pixel levels using the adjusted gain control signals to provide engine pixel levels;

providing the engine pixel levels to corresponding light sources to expose the photoreceptor in respective pixel areas with light corresponding to the compensated pixel levels.

According to another aspect of the present invention, there is provided a method for providing gain control to light emitting pixels of a printer depending on a particular type of halftone screen selected from a group of halftone screens comprising:

providing a print head having a plurality of different light sources wherein each light source can produce different levels of light, an electronic version of each halftone screen, and a plurality of stored gain control adjustment signals for each light source based upon the light output of that light source;

selecting a particular hard copy test target halftone image corresponding to the electronic version of a selected screen; and scanning the selected hard copy test target halftone screen and providing data representing differences in density between the hardcopy test target and the electronic version of the selected screen;

producing adjusted gain control signals for each of the different light sources for the selected halftone screen based upon the density-difference data; and repeating the selecting through producing steps for each halftone screen in the group of halftone screens.

According to another aspect of the present invention, there is provided a method for providing gain control to light emitting pixels of a printer depending on a particular type of halftone screen selected from a group of halftone screens comprising:

providing a print head having a plurality of different light sources wherein each light source can produce different levels of light, an electronic version of each halftone screen, and a plurality of stored gain control adjustment signals for each light source based upon the light output of that light source;

selecting a particular hard copy test target halftone image corresponding to the electronic version of a selected screen; and scanning the selected hard copy test target halftone screen and providing data representing differences in density between the hardcopy test target and the electronic version of the selected screen;

producing first adjusted gain control signals for each of the different light sources for the selected halftone screen from the stored gain control adjustment signals based upon the density-difference data;

receiving a screen correlation factor corresponding to one of the halftone screens in the group other than the selected screen; and producing second adjusted gain control signals from the first adjusted gain control signals for the one of the halftone screens based upon the received screen correlation factor for the one of the halftone screens.

An advantage of this invention is that it provides effective compensation for selected halftone screens, and for jobs including multiple screen types in one printed image. Various embodiments provide effective gain control of compensation profiles for selected halftone screens and selected print densities.

BRIEF DESCRIPTION OF THE DRAWINGS

The above and other objects, features, and advantages of the present invention will become more apparent when taken in conjunction with the following description and drawings wherein identical reference numerals have been used, where possible, to designate identical features that are common to the figures, and wherein:

FIG. 2 is a schematic of a data-processing path useful with various embodiments;

FIG. 3 is a diagram showing the components of a processing system useful with various embodiments;

Figure 1:
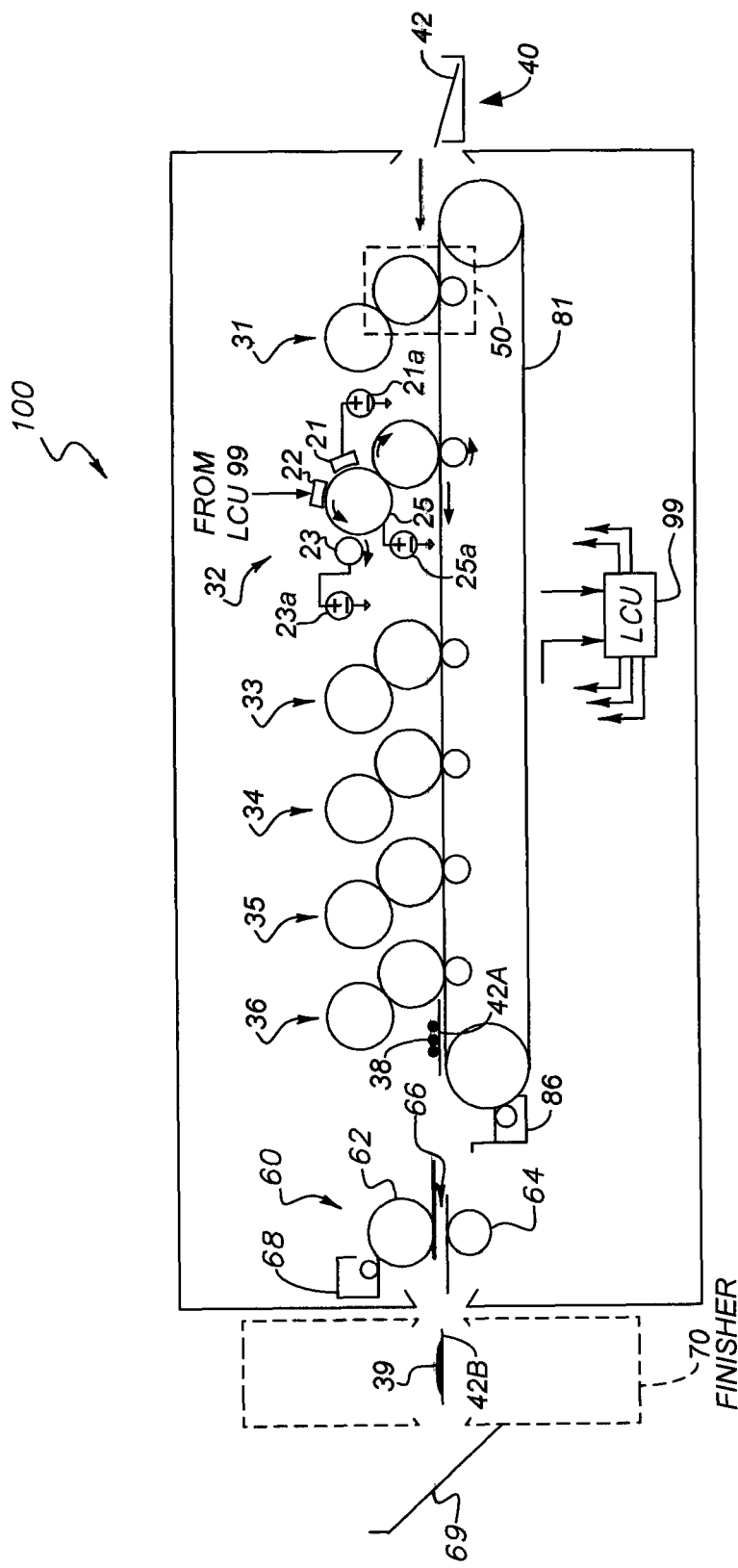
FIG. 1 is an elevational cross-section of an electrophotographic reproduction apparatus.

The attached drawings are for purposes of illustration and are not necessarily to scale.

DETAILED DESCRIPTION OF THE INVENTION

In the following description, some embodiments will be described in terms that would ordinarily be implemented as software programs. Those skilled in the art will readily recognize that the equivalent of such software can also be constructed in hardware. Because image manipulation algorithms and systems are well known, the present description will be directed in particular to algorithms and systems forming part of, or cooperating more directly with, methods described herein. Other aspects of such algorithms and systems, and hardware or software for producing and otherwise processing the image signals involved therewith, not specifically shown or described herein, are selected from such systems, algorithms, components, and elements known in the art. Given the system as described herein, software not specifically shown, suggested, or described herein that is useful for implementation of various embodiments is conventional and within the ordinary skill in such arts.

A computer program product can include one or more storage media, for example; magnetic storage media such as magnetic disk (such as a floppy disk) or magnetic tape; optical storage media such as optical disk, optical tape, or machine readable bar code; solid-state electronic storage devices such as random access memory (RAM), or read-only memory (ROM); or any other physical device or media employed to store a computer program having instructions for controlling one or more computers to practice methods according to various embodiments.

The electrophotographic (EP) printing process can be embodied in devices including printers, copiers, scanners, and facsimiles, and analog or digital devices, all of which are referred to herein as "printers." Electrostatographic printers such as electrophotographic printers that employ toner developed on an electrophotographic receiver can be used, as can ionographic printers and copiers that do not rely upon an electrophotographic receiver. Electrophotography and ionography are types of electrostatography (printing using electrostatic fields), which is a subset of electrography (printing using electric fields).

A digital reproduction printing system ("printer") typically includes a digital front-end processor (DFE), a print engine (also referred to in the art as a "marking engine") for applying toner to the receiver, and one or more post-printing finishing system(s) (e.g. a UV coating system, a glosser system, or a laminator system). A printer can reproduce pleasing black-and-white or color onto a receiver. A printer can also produce selected patterns of toner on a receiver, which patterns (e.g. surface textures) do not correspond directly to a visible image. The DFE receives input electronic files (such as Postscript command files) composed of images from other input devices (e.g., a scanner, a digital camera). The DFE can include various function processors, e.g. a raster image processor (RIP), image positioning processor, image manipulation processor, color processor, or image storage processor. The DFE rasterizes input electronic files into image bitmaps for the print engine to print. In some embodiments, the DFE permits a human operator to set up parameters such as layout, font, color, media type, or post-finishing options. The print engine takes the rasterized image bitmap from the DFE and renders the bitmap into a form that can control the printing process from the exposure device to transferring the print image onto the receiver. The finishing system applies features such as protection, glossing, or binding to the prints. The finishing system can be implemented as an integral component of a printer, or as a separate machine through which prints are fed after they are printed.

The printer can also include a color management system which captures the characteristics of the image printing process implemented in the print engine (e.g. the electrophotographic process) to provide known, consistent color reproduction characteristics. The color management system can also provide known color reproduction for different inputs (e.g. digital camera images or film images).

In an embodiment of an electrophotographic modular printing machine, e.g. the NEXPRESS 3000SE printer manufactured by Eastman Kodak Company of Rochester, N.Y., color-toner print images are made in a plurality of color imaging modules arranged in tandem, and the print images are successively electrostatically transferred to a receiver adhered to a transport web moving through the modules. Colored toners include colorants, e.g. dyes or pigments, which absorb specific wavelengths of visible light. Commercial machines of this type typically employ intermediate transfer members in the respective modules for transferring visible images from the photoreceptor and transferring print images to the receiver. In other electrophotographic printers, each visible image is directly transferred to a receiver to form the corresponding print image.

Electrophotographic printers having the capability to also deposit clear toner using an additional imaging module are also known. As used herein, clear toner is considered to be a color of toner, as are C, M, Y, K, and Lk, but the term "colored toner" excludes clear toners. The provision of a clear-toner overcoat to a color print is desirable for providing protection of the print from fingerprints and reducing certain visual artifacts. Clear toner uses particles that are similar to the toner particles of the color development stations but without colored material (e.g. dye or pigment) incorporated into the toner particles. However, a clear-toner overcoat can add cost and reduce color gamut of the print; thus, it is desirable to provide for operator/user selection to determine whether or not a clear-toner overcoat will be applied to the entire print. A uniform layer of clear toner can be provided. A layer that varies inversely according to heights of the toner stacks can also be used to establish level toner stack heights. The respective toners are deposited one upon the other at respective locations on the receiver and the height of a respective toner stack is the sum of the toner heights of each respective color. Uniform stack height provides the print with a more even or uniform gloss.

FIG. 1 is an elevational cross-section showing portions of a typical electrophotographic printer 100. Printer 100 is adapted to produce print images, such as single-color (monochrome), CMYK, or hexachrome (six-color) images, on a receiver (multicolor images are also known as "multi-component" images). Images can include text, graphics, photos, and other types of visual content. An embodiment involves printing using an electrophotographic print engine having six sets of single-color image-producing or -printing stations or modules arranged in tandem, but more or fewer than six colors can be combined to form a print image on a given receiver. Other electrophotographic writers or printer apparatus can also be included. Various components of printer 100 are shown as rollers; other configurations are also possible, including belts.

Referring to FIG. 1, printer 100 is an electrophotographic printing apparatus having a number of tandemly-arranged electrophotographic image-forming printing modules 31, 32, 33, 34, 35, 36, also known as electrophotographic imaging subsystems. Each printing module 31, 32, 33, 34, 35, 36 produces a single-color toner image for transfer using a respective transfer subsystem 50 (for clarity, only one is labeled) to a receiver 42 successively moved through the printing modules 31, 32, 33, 34, 35, 36. Receiver 42 is transported from supply unit 40, which can include active feeding subsystems as known in the art, into printer 100. In various embodiments, the visible image can be transferred directly from an imaging roller to a receiver 42, or from an imaging roller to one or more transfer roller(s) or belt(s) in sequence in transfer subsystem 50, and thence to receiver 42. Receiver 42 is, for example, a selected section of a web of, or a cut sheet of, planar media such as paper or transparency film.

Each printing module 31, 32, 33, 34, 35, 36 includes various components. For clarity, these are only shown in printing module 32. Around photoreceptor 25 are arranged, ordered by the direction of rotation of photoreceptor 25, charger 21, exposure subsystem 22, and toning station 23.

In the EP process, an electrostatic latent image is formed on photoreceptor 25 by uniformly charging photoreceptor 25 and then discharging selected areas of the uniform charge to yield an electrostatic charge pattern corresponding to the desired image (a "latent image"). Charger 21 produces a uniform electrostatic charge on photoreceptor 25 or its surface. Exposure subsystem 22 selectively image-wise discharges photoreceptor 25 to produce a latent image. Exposure subsystem 22 can include a laser and raster optical scanner (ROS), one or more LEDs, or a linear LED array.

After the latent image is formed, charged toner particles are brought into the vicinity of photoreceptor 25 by toning station 23 and are attracted to the latent image to develop the latent image into a visible image. Note that the visible image may not be visible to the naked eye depending on the composition of the toner particles (e.g. clear toner). Toning station 23 can also be referred to as a development station. Toner can be applied to either the charged or discharged parts of the latent image.

After the latent image is developed into a visible image on photoreceptor 25, a suitable receiver 42 is brought into juxtaposition with the visible image. In transfer subsystem 50, a suitable electric field is applied to transfer the toner particles of the visible image to receiver 42 to form the desired print image 38 on the receiver, as shown on receiver 42A. The imaging process is typically repeated many times with reusable photoreceptors 25.

Receiver 42A is then removed from its operative association with photoreceptor 25 and subjected to heat or pressure to permanently fix ("fuse") print image 38 to receiver 42A. Plural print images, e.g. of separations of different colors, are overlaid on one receiver 42 before fusing to form a multi-color print image 38 on receiver 42A.

Each receiver 42, during a single pass through the six printing modules, can have transferred in registration thereto up to six single-color toner images to form a pentachrome image. As used herein, the term "hexachrome" implies that in a print image 38, combinations of various of the six colors are combined to form other colors on receiver 42 at various locations on receiver 42. That is, each of the six colors of toner can be combined with toner of one or more of the other colors at a particular location on receiver 42 to form a color different than the colors of the toners combined at that location. In an embodiment, printing module 31 forms black (K) print images, 32 forms yellow (Y) print images, 33 forms magenta (M) print images, 34 forms cyan (C) print images, 35 forms light-black (Lk) images, and 36 forms clear images.

In various embodiments, printing module 36 forms print image 38 using a clear toner or tinted toner. Tinted toners absorb less light than they transmit, but do contain pigments or dyes that move the hue of light passing through them towards the hue of the tint. For example, a blue-tinted toner coated on white paper will cause the white paper to appear light blue when viewed under white light, and will cause yellows printed under the blue-tinted toner to appear slightly greenish under white light.

Receiver 42A is shown after passing through printing module 36. Print image 38 on receiver 42A includes unfused toner particles.

Subsequent to transfer of the respective print images, overlaid in registration, one from each of the respective printing modules 31, 32, 33, 34, 35, 36, receiver 42A is advanced to a fuser 60, i.e. a fusing or fixing assembly, to fuse print image 38 to receiver 42A. Transport web 81 transports the print-image-carrying receivers 42A to fuser 60, which fixes the toner particles to the respective receivers 42A by the application of heat and pressure. The receivers 42A are serially de-tacked from transport web 81 to permit them to feed cleanly into fuser 60. Transport web 81 is then reconditioned for reuse at cleaning station 86 by cleaning and neutralizing the charges on the opposed surfaces of the transport web 81. A mechanical cleaning station (not shown) for scraping or vacuuming toner off transport web 81 can also be used independently or with cleaning station 86. The mechanical cleaning station can be disposed along transport web 81 before or after cleaning station 86 in the direction of rotation of transport web 81.

Fuser 60 includes a heated fusing roller 62 and an opposing pressure roller 64 that form a fusing nip 66 therebetween. In an embodiment, fuser 60 also includes a release fluid application substation 68 that applies release fluid, e.g. silicone oil, to fusing roller 62. Alternatively, wax-containing toner can be used without applying release fluid to fusing roller 62. Other embodiments of fusers, both contact and non-contact, can be employed. For example, solvent fixing uses solvents to soften the toner particles so they bond with the receiver 42A. Photoflash fusing uses short bursts of high-frequency electromagnetic radiation (e.g. ultraviolet light) to melt the toner. Radiant fixing uses lower-frequency electromagnetic radiation (e.g. infrared light) to more slowly melt the toner. Microwave fixing uses electromagnetic radiation in the microwave range to heat the receivers 42A (primarily), thereby causing the toner particles to melt by heat conduction, so that the toner is fixed to the receiver 42A.

The receivers (e.g., receiver 42B) carrying the fused image (e.g., fused image 39) are transported in a series from the fuser 60 along a path either to a remote output tray 69, or back to printing modules 31, 32, 33, 34, 35, 36 to create an image on the backside of the receiver (e.g., receiver 42B), i.e. to form a duplex print. Receivers (e.g., receiver 42B) can also be transported to any suitable output accessory. For example, an auxiliary fuser or glossing assembly can provide a clear-toner overcoat. Printer 100 can also include multiple fusers 60 to support applications such as overprinting, as known in the art.

In various embodiments, between fuser 60 and output tray 69, receiver 42B passes through finisher 70. Finisher 70 performs various media-handling operations, such as folding, stapling, saddle-stitching, collating, and binding.

Printer 100 includes main printer apparatus logic and control unit (LCU) 99, which receives input signals from the various sensors associated with printer 100 and sends control signals to the components of printer 100. LCU 99 can include a microprocessor incorporating suitable look-up tables and control software executable by the LCU 99. It can also include a field-programmable gate array (FPGA), programmable logic device (PLD), microcontroller, or other digital control system. LCU 99 can include memory for storing control software and data. Sensors associated with the fusing assembly provide appropriate signals to the LCU 99. In response to the sensors, the LCU 99 issues command and control signals that adjust the heat or pressure within fusing nip 66 and other operating parameters of fuser 60 for receivers 42A. This permits printer 100 to print on receivers 42A of various thicknesses and surface finishes, such as glossy or matte.

Image data for writing by printer 100 can be processed by a raster image processor (RIP; not shown), which can include a color separation screen generator or generators. The output of the RIP can be stored in frame or line buffers for transmission of the color separation print data to each of respective LED writers, e.g. for black (K), yellow (Y), magenta (M), cyan (C), and red (R), respectively. The RIP or color separation screen generator can be a part of printer 100 or remote therefrom. Image data processed by the RIP can be obtained from a color document scanner or a digital camera or produced by a computer or from a memory or network which typically includes image data representing a continuous image that needs to be reprocessed into halftone image data in order to be adequately represented by the printer. The RIP can perform image processing processes, e.g. color correction, in order to obtain the desired color print. Color image data is separated into the respective colors and converted by the RIP to halftone dot image data in the respective color using matrices, which comprise desired screen angles (measured counterclockwise from rightward, the +X direction) and screen rulings. The RIP can be a suitably-programmed computer or logic device and is adapted to employ stored or computed matrices and templates for processing separated color image data into rendered image data in the form of halftone information suitable for printing. These matrices can include a screen pattern memory (SPM).

Various parameters of the components of a printing module (e.g., printing module 31) can be selected to control the operation of printer 100. In an embodiment, charger 21 is a corona charger including a grid between the corona wires (not shown) and photoreceptor 25. Voltage source 21a applies a voltage to the grid to control charging of photoreceptor 25. In an embodiment, a voltage bias is applied to toning station 23 by voltage source 23a to control the electric field, and thus the rate of toner transfer, from toning station 23 to photoreceptor 25. In an embodiment, a voltage is applied to a conductive base layer of photoreceptor 25 by voltage source 25a before development, that is, before toner is applied to photoreceptor 25 by toning station 23. The applied voltage can be zero; the base layer can be grounded. This also provides control over the rate of toner deposition during development. In an embodiment, the exposure applied by exposure subsystem 22 to photoreceptor 25 is controlled by LCU 99 to produce a latent image corresponding to the desired print image. All of these parameters can be changed, as described below.

Further details regarding printer 100 are provided in U.S. Pat. No. 6,608,641, issued on Aug. 19, 2003, to Peter S. Alexandrovich et al., and in U.S. Publication No. 20060133870, published on Jun. 22, 2006, by Yee S. Ng et al., the disclosures of which are incorporated herein by reference.

FIG. 2 shows a data-processing path useful with various embodiments, and defines several terms used herein. Printer 100 (FIG. 1) or corresponding electronics (e.g. the DFE or RIP), described herein, operate this datapath to produce image data corresponding to exposure to be applied to a photoreceptor 25, as described above. The datapath can be partitioned in various ways between the DFE and the print engine, as is known in the image-processing art.

The following discussion relates to a single pixel; in operation, data processing takes place for a plurality of pixels that together compose an image. The term "resolution" herein refers to spatial resolution, e.g. in cycles per degree. The term "bit depth" refers to the range and precision of values. Each set of pixel levels has a corresponding set of pixel locations. Each pixel location is the set of coordinates on the surface of receiver 42 (FIG. 1) at which an amount of toner corresponding to the respective pixel level should be applied.

Printer 100 receives input pixel levels 200. These can be any level known in the art, e.g. sRGB code values (0 ... 255) for red, green, and blue (R, G, B) color channels. There is one pixel level for each color channel. Input pixel levels 200 can be in an additive or subtractive space. Image-processing path 210 converts input pixel levels 200 to output pixel levels 220, which can be cyan, magenta, yellow (CMY); cyan, magenta, yellow, black (CMYK); or values in another subtractive color space. This conversion can be part of the color-management system discussed above. Output pixel level 220 can be linear or non-linear with respect to exposure, L*, or other factors known in the art.

Image-processing path 210 transforms input pixel levels 200 of input color channels (e.g. R) in an input color space (e.g. sRGB) to output pixel levels 220 of output color channels (e.g. C) in an output color space (e.g. CMYK). In various embodiments, image-processing path 210 transforms input pixel levels 200 to desired CIELAB (CIE 1976 L*a*b*; CIE Pub. 15:2004, 3rd. ed., §8.2.1) values or ICC PCS (Profile Connection Space) LAB values, and thence optionally to values representing the desired color in a wide-gamut encoding such as ROMM RGB. The CIELAB, PCS LAB or ROMM RGB values are then transformed to device-dependent CMYK values to maintain the desired colorimetry of the pixels. Image-processing path 210 can use optional workflow inputs 205, e.g. ICC profiles of the image and the printer 100, to calculate the output pixel levels 220. RGB can be converted to CMYK according to the Specifications for Web Offset Publications (SWOP; ANSI CGATS TR001 and CGATS.6), Euroscale (ISO 2846-1:2006 and ISO 12647), or other CMYK standards. Part of an embodiment of image-processing path 210 is shown in FIG. 2B, discussed below.

Input pixels are associated with an input resolution in pixels per inch (ippi, input pixels per inch), and output pixels with an output resolution (oppi). Image-processing path 210 scales or crops the image, e.g. using bicubic interpolation, to change resolutions when ippi≠oppi. The following steps in the path (output pixel levels 220, screened pixel levels 260) are preferably also performed at oppi, but each can be a different resolution, with suitable scaling or cropping operations between them.

Screening unit 250 calculates screened pixel levels 260 from output pixel levels 220. Screening unit 250 can perform continuous-tone (processing), halftone, multitone, or multi-level halftone processing, and can include a screening memory or dither bitmaps. Screened pixel levels 260 are at the bit depth required by compensation unit 262.

Compensation unit 262, described below with respect to FIGS. 4-7, transforms screened pixel levels 260 and locations into engine pixel levels 265 and locations. The engine pixel levels 265 and locations are provided to print engine 270. Each engine pixel level 265 is correlated to the desired exposure at the respective engine pixel location on photoreceptor 25 (FIG. 1).

Print engine 270 represents the subsystems in printer 100 that apply an amount of toner corresponding to the engine pixel levels to a receiver 42 (FIG. 1) at the respective pixel locations. Examples of these subsystems are described above with reference to FIG. 1. At each compensated pixel location, exposure corresponding to the respective compensated pixel level is provided. Print engine 270 can also subsample or perform other processing on compensated pixel levels and locations to provide engine pixel levels and locations.

FIG. 3 is a high-level diagram showing the components of a processing system useful with various embodiments. The system includes a data processing system 310, a peripheral system 320, a user interface system 330, and a data storage system 340. Peripheral system 320, user interface system 330 and data storage system 340 are communicatively connected to data processing system 310.

Data processing system 310 includes one or more data processing devices that implement the processes of various embodiments, including the example processes described herein. The phrases "data processing device" or "data processor" are intended to include any data processing device, such as a central processing unit ("CPU"), a desktop computer, a laptop computer, a mainframe computer, a personal digital assistant, a Blackberry™, a digital camera, cellular phone, or any other device for processing data, managing data, or handling data, whether implemented with electrical, magnetic, optical, biological components, or otherwise.

Data storage system 340 includes one or more processor-accessible memories configured to store information, including the information needed to execute the processes of the various embodiments, including the example processes described herein. Data storage system 340 can be a distributed processor-accessible memory system including multiple processor-accessible memories communicatively connected to data processing system 310 via a plurality of computers or devices. On the other hand, data storage system 340 need not be a distributed processor-accessible memory system and, consequently, can include one or more processor-accessible memories located within a single data processor or device.

The phrase "processor-accessible memory" is intended to include any processor-accessible data storage device, whether volatile or nonvolatile, electronic, magnetic, optical, or otherwise, including but not limited to, registers, floppy disks, hard disks, Compact Discs, DVDs, flash memories, ROMs, and RAMs.

The phrase "communicatively connected" is intended to include any type of connection, whether wired or wireless, between devices, data processors, or programs in which data can be communicated. The phrase "communicatively connected" is intended to include a connection between devices or programs within a single data processor, a connection between devices or programs located in different data processors, and a connection between devices not located in data processors at all. In this regard, although the data storage system 340 is shown separately from data processing system 310, one skilled in the art will appreciate that data storage system 340 can be stored completely or partially within data processing system 310. Further in this regard, although peripheral system 320 and user interface system 330 are shown separately from data processing system 310, one skilled in the art will appreciate that one or both of such systems can be stored completely or partially within data processing system 310.

Peripheral system 320 can include one or more devices configured to provide digital content records to data processing system 310. For example, peripheral system 320 can include digital still cameras, digital video cameras, cellular phones, or other data processors. Data processing system 310, upon receipt of digital content records from a device in peripheral system 320, can store such digital content records in data storage system 340. Peripheral system 320 can also include a printer interface for causing a printer to produce output corresponding to digital content records stored in data storage system 340 or produced by data processing system 310.

User interface system 330 can include a mouse, a keyboard, another computer, or any device or combination of devices from which data is input to data processing system 310. In this regard, although peripheral system 320 is shown separately from user interface system 330, peripheral system 320 can be included as part of user interface system 330.

User interface system 330 also can include a display device, a processor-accessible memory, or any device or combination of devices to which data is output by data processing system 310. In this regard, if user interface system 330 includes a processor-accessible memory, such memory can be part of data storage system 340 even though user interface system 330 and data storage system 340 are shown separately in FIG. 3.

Figure 4:
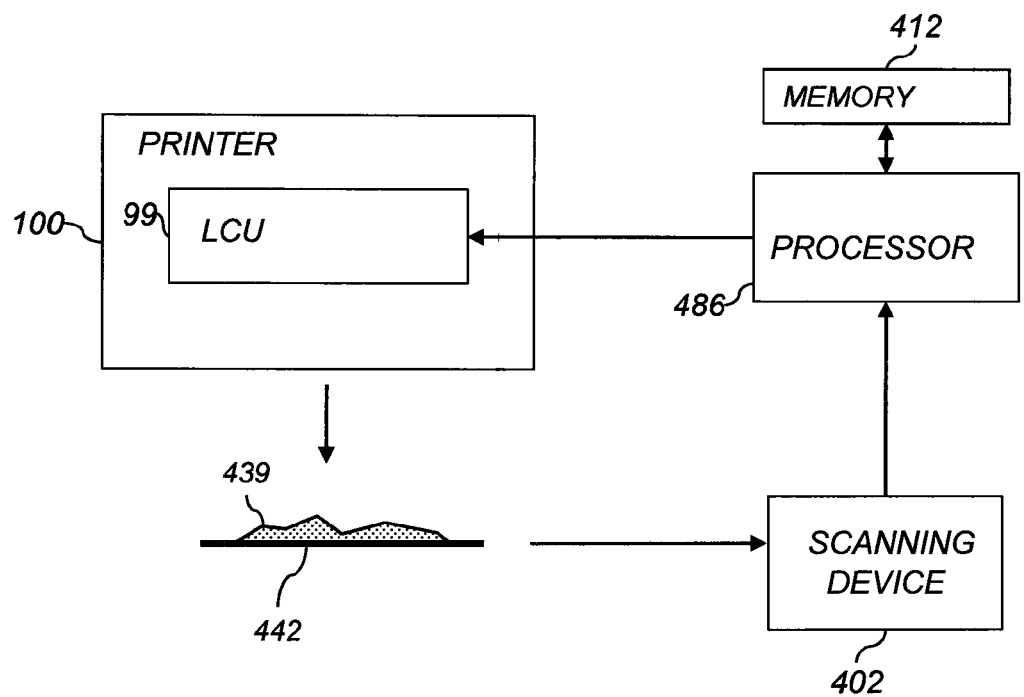
FIG. 4 is a block diagram of a system according to various embodiments.

FIG. 4 is a simplified block diagram of a system according to various embodiments. Printer 100 and LCU 99 are shown in FIG. 1 Printer 100 produces fused image 439 of a test target on receiver 442. Scanning device 402 scans image 439, as described below.

To correct or compensate for one or more non-uniformities in a printed image, printer 100 prints a target (fused image 439) for each color channel. The printed targets are then scanned by scanning device 402. Scanning device 402 can be an off-line scanner, e.g., a flatbed scanner, or can be an in-line scanner included as part of, attached to, printer 100. The scanned data is used by processor 486 to produce one or more correction profiles for printer 100. The one or more correction profiles are stored in memory 412, which can be part of processor 486, and can be volatile or nonvolatile. Processor 486 can be implemented as any one of a variety of controllers, including, but not limited to, a processor, a computing device, a computer, and a server.

When printer 100 is to print an image, LCU 99 receives the image data and correction profile(s). The profile(s) are used to correct or compensate for the non-uniformities during the exposure process by the exposure device.

Figure 5:
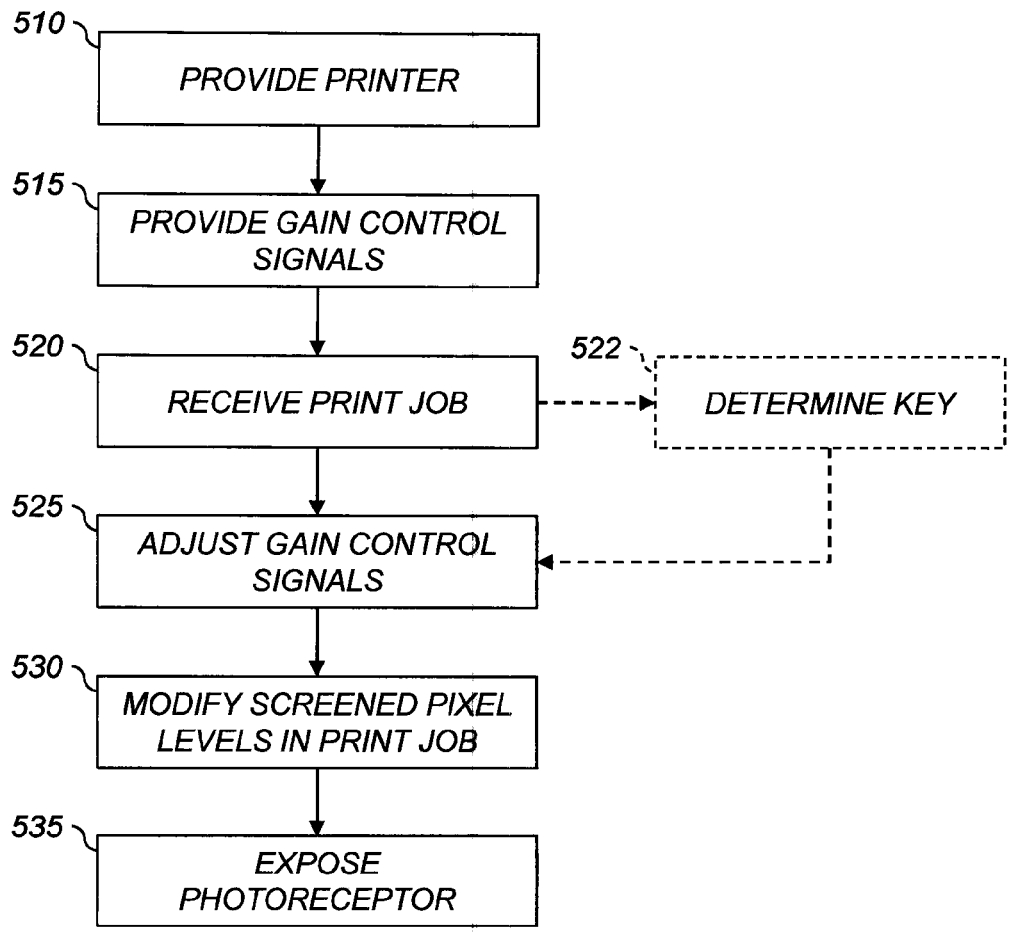
FIG. 5 is a flowchart of a method of compensating for nonuniformity in a printer.

FIG. 5 shows a method of compensating for nonuniformity in a printer. Processing begins with step 510.

In step 510, the printer is provided. The printer 100 (FIG. 1) has a photoreceptor, e.g., photoreceptor 25 (FIG. 1). Printer 100 also has a print head (e.g., exposure subsystem 22, FIG. 1) with a plurality of different light sources. Each light source is capable of producing a plurality of different levels of light. In various embodiments, printer 100 is an electrophotographic printer and each light source is a light emitting diode (LED). A laser and raster optical scanner (ROS) can also be used, in which case a "light source" is considered to be the laser plus one orientation of the ROS. Each orientation of the ROS to expose a different engine pixel on receiver 42 (FIG. 1) is a different "light source" as defined herein. Optically-exposed silver halide (AgX) printers producing halftoned prints can also be compensated. Step 510 is followed by step 515.

In step 515, a plurality of stored gain control signals are provided, one for each light source. The gain control signal for a light source is based upon the light output of that light source. In various embodiments, the gain control signal for a light source is the ratio of a desired light output power to the actual light output power of that light source. For example, if a particular light source only produces 80% of the desired light output, its gain control signal is 125% (125%×80%=100%). Gain control signals can be determined by radiometric measurement of each light source. Step 515 is followed by step 520.

In step 520, data for a print job are received. The data include screened pixel levels for corresponding pixel locations. The print job data also include a halftone screen specification. For purposes of this disclosure, a print job can be a full page or portion of a page. In printed pages having multiple halftone patterns, the print job data can include multiple halftone screen specifications and respective coordinates or other spatial information indicating to which screened pixel levels each specified halftone applies. Step 520 is followed by step 525 and optional step 522.

In optional step 522, a key of the print job is determined. High-key jobs have predominantly highlight content, low-key jobs have predominantly shadow content, and typical (normal-key) jobs have predominantly midtone content. Key can be determined by taking a histogram of the image content of the print job and determining what percentage of the pixels fall within selected ranges for the different keys. The range with the highest percentage of pixels can be selected as the key of the image. Step 522 is followed by step 525.

In step 525, the stored gain control signals are adjusted based on the halftone screen specification. In embodiments using step 522, the stored gain control signals are further adjusted based on the determined key. Step 525 is followed by step 530.

In step 530, the screened pixel levels are modified using the adjusted gain control signals to provide engine pixel levels. Engine pixel levels correspond to the desired exposure of a particular pixel. In various embodiments, exposure is controlled by varying the exposure time, so engine pixel level corresponds to exposure time (light source on-time). Step 530 is followed by step 535.

In step 535, the engine pixel levels are provided to corresponding light sources to expose photoreceptor 25 (FIG. 1) in respective pixel areas with light corresponding to the compensated pixel levels. This is described above with respect to FIG. 1.

In various embodiments, step 525 includes looking up the adjusted gain control signals in a lookup table (LUT) indexed by the halftone screen specification. Instead of a LUT, a spline or other function can be evaluated. In various embodiments, the lookup table has one entry per light source, per halftone screen. The tables for each screen are determined empirically by printing and measuring test targets, as discussed further below with reference to FIG. 6. In some embodiments, the screened pixel levels are mapped through a LUT selected according to the halftone screen to provide engine pixel levels directly, without using gain control signals. In other embodiments, the gain control signals represent the light output of particular LEDs. The gain control signals are adjusted to provide the light output in a particular halftone that will give equivalent exposure to the unadjusted gain control signal in a reference halftone.

In some embodiments using step 522, the lookup table is further indexed by the determined key or a portion thereof. That is, the lookup table has one entry per light source, per halftone screen, per key. Any number of keys can be used, e.g., high, normal, and low.

Figure 6:
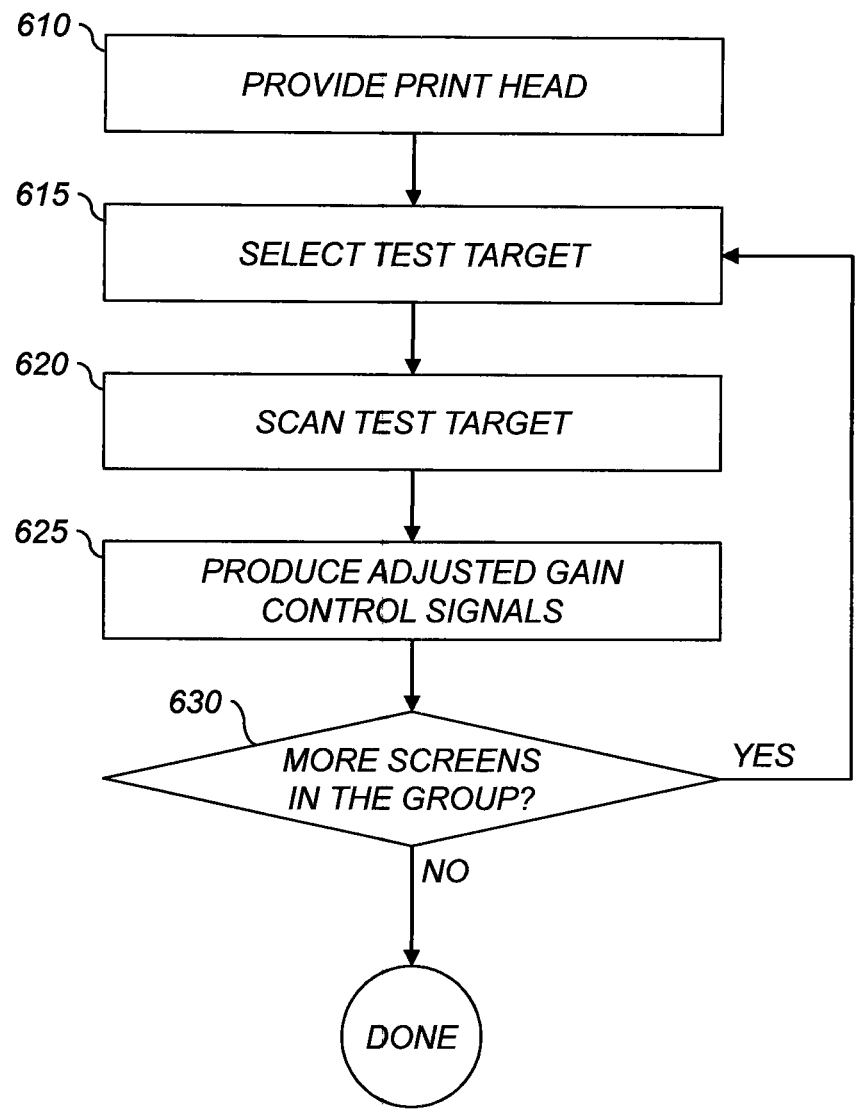
FIGS. 6 and 7 are flowcharts of methods of providing gain control to light emitting pixels of a printer depending on a particular type of halftone screen.

FIG. 6 shows a method of providing gain control to light emitting pixels of a printer depending on a particular type of halftone screen. Examples of types of halftone screen include dot screens (circles that grow in size as density increases), line screens (lines that grow in thickness as density increases), and contones (patterns using multiple levels of exposure to vary density directly, rather than using halftoning or multitoning to simulate density variations). These screens can be binary-halftoned (every pixel is present or absent) or multitoned (different dots can have different sizes). Halftone screens can have various pitches in lines per inch (lpi). The particular halftone screen is selected from a group of halftone screens. Processing begins with step 610.

In step 610, a print head is provided having a plurality of different light sources. Each light source can produce different levels of light. An electronic version of each halftone screen is also provided, as are a plurality of stored gain control adjustment signals for each light source based upon the light output of that light source. The gain control adjustment signals are described above. Step 610 is followed by step 615.

In step 615, a particular hard copy test target halftone image is selected. The selected target image corresponds to the electronic version of a selected screen. For example, the target image can be a uniform field of a selected density level, rendered with the selected halftone screen. Such a target would, for example, produce on the receiver a 45°-oriented array of equal-size black dots. Step 615 is followed by step 620.

In step 620, the selected hard copy test target halftone screen is scanned. Using the scan, data are provided representing differences in density between the hardcopy test target and the electronic version of the selected screen. In an example, streaking correction is performed. Each column of the image is produced by a particular light source, so the difference in density between columns represents the difference in output between light sources. The test target is used so that factors in addition to the light sources themselves, notably halftone pattern, can be evaluated. Further details about various embodiments of the test target and processing are described below with reference to FIGS. 8-10. Step 620 is followed by step 625.

In step 625, adjusted gain control signals for each of the different light sources are produced for the selected halftone screen based upon the density-difference data. For example, if the density-difference data indicate that a particular column produces output less dense than desired, the gain control signal for the corresponding light source can be increased. Step 625 is followed by decision step 630.

Decision step 630 decides whether there are more screens in the group. If so, the next step is step 615. In this way, the selecting through producing steps are repeated for each halftone screen in the group of halftone screens.

Figure 7:
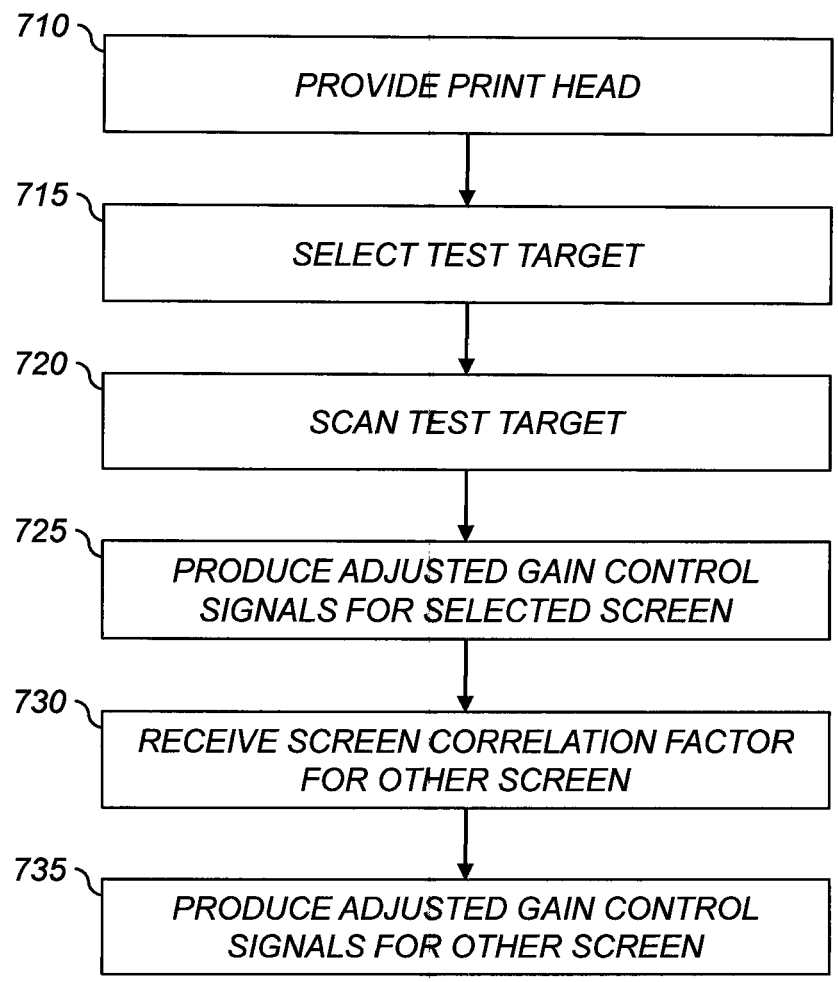

FIG. 7 shows a method of providing gain control to light emitting pixels of a printer depending on a particular type of halftone screen, e.g., a dot screen, line screen, or contone. The particular halftone screen is selected from a group of halftone screens. Processing begins with step 710.

In step 710, a print head is provided having a plurality of different light sources. Each light source can produce different levels of light. An electronic version of each halftone screen is also provided, as are a plurality of stored gain control adjustment signals for each light source based upon the light output of that light source. Step 710 is followed by step 715.

In step 715, a particular hard copy test target halftone image is selected. The selected target image corresponds to the electronic version of a selected screen. This is similar to the processing described above in FIG. 6. Step 715 is followed by step 720.

In step 720, the selected hard copy test target halftone screen is scanned. Using the scan, data are provided representing differences in density between the hardcopy test target and the electronic version of the selected screen. Step 720 is followed by step 725.

In step 725, first adjusted gain control signals for each of the different light sources are produced from the stored gain control adjustment signals for the selected halftone screen based upon the density-difference data. Step 725 is followed by step 730.

In step 730, a screen correlation factor corresponding to one of the halftone screens (hereinafter the "second screen") in the group other than the selected screen is received. The screen correlation factor relates the density profile of the selected screen to that of the second screen. Step 730 is followed by step 735.

In step 735, second adjusted gain control signals are produced for the second screen from the first adjusted gain control signals based upon the received screen correlation factor for the second screens. Steps 730 and 735 can be repeated for one or more other screens in the group of screens other than the selected screen. In an embodiment, each first adjusted gain control signal is multiplied by the screen correlation factor, or by a screen correlation factor selected from a plurality of screen correlation factors for different densities and light sources.

In an embodiment, the screen correlation factor is determined by printing a selected test target with different screens. The densities of test patches on the target are determined for each screen. The relationships of densities between the two screens are then stored as the screen correlation factor. Multiple screen correlation factors can also be used, one for each density or one for each LED. The factors can be subsampled or interpolated, and stored in a LUT or as coefficients of a function that is evaluated to determine a particular factor.

In various embodiments, the stored gain control signals and density-difference data (e.g., FIG. 6) are produced using techniques described in US Patent Publication US20100097657, the disclosure of which is incorporated herein by reference. Some of these techniques are described in FIGS. 8-9 and make use of a test target shown in FIG. 10.

Figure 8:
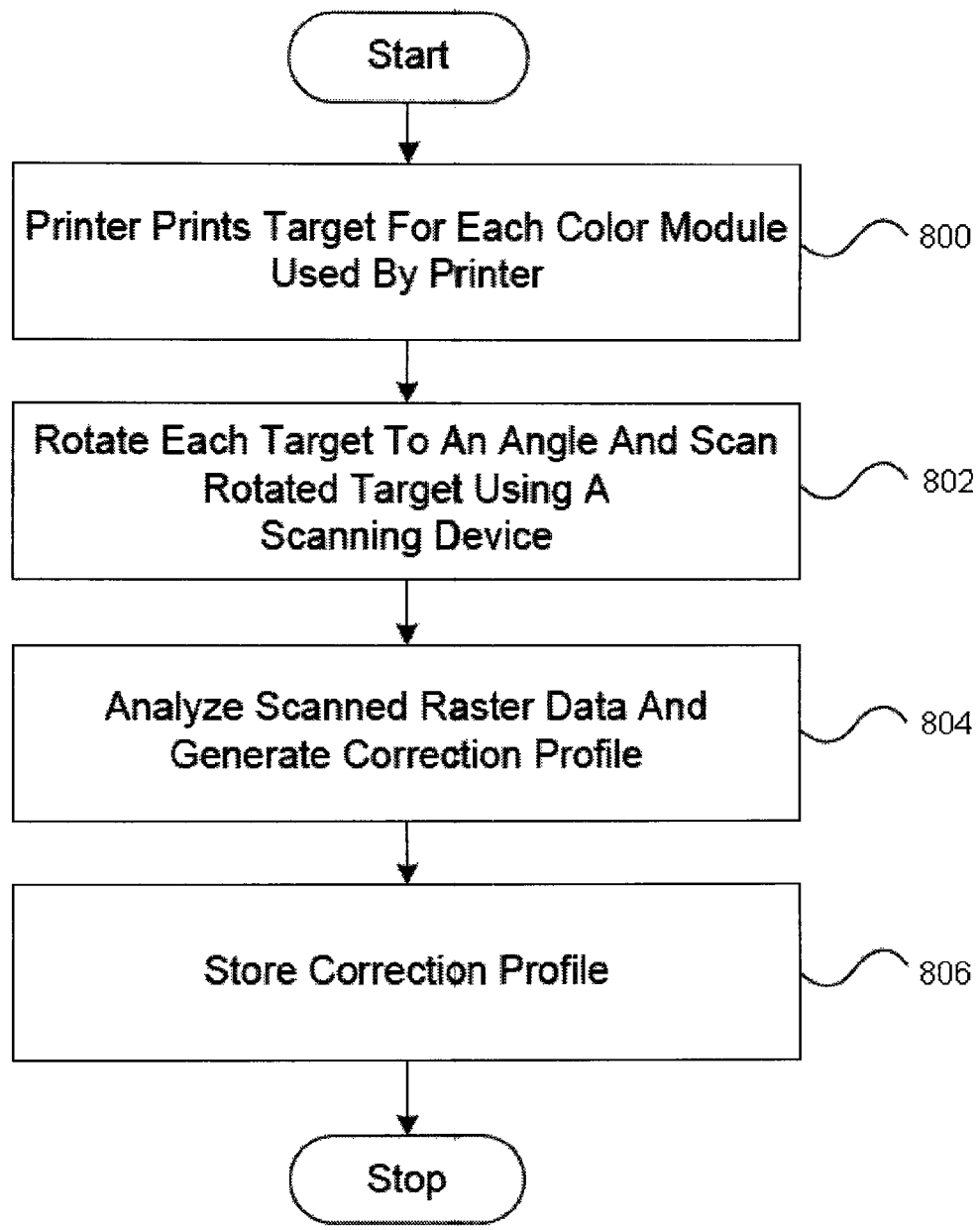
FIG. 8 is a flowchart of a method for producing a correction profile for a printing system.

FIG. 8 is a flowchart of a method for producing a correction profile for a printing system. The method of FIG. 8 can be used to produce one or multiple correction profiles for a printer. The correction profile is used to reduce non-uniformities in a printed image. Initially, a target is printed for each color module that is used by the printer (step 800). Thus, four targets are printed for CMYK printers; one target for cyan, one for magenta, one for yellow, and one for black. The target includes one or more uniform density images that extend in transverse to the process direction of the printer and includes one or more different types of alignment marks in an embodiment.

Each target is rotated to an angle and then scanned by a scanning device, as shown in step 802. The angle can be any given angle. For example, in an embodiment, the angle is ninety (90) degrees.

The raster data produced by the scanning device for each target is then analyzed and a correction profile created for the printer (step 804). Step 804 will be described in more detail in conjunction with FIG. 9. The correction profile is then stored, as shown in step 806. The correction profile can be stored, for example, in the printer itself, in a print server connected to the printer via a network connection, or in a memory connected to the printer.

Figure 9:
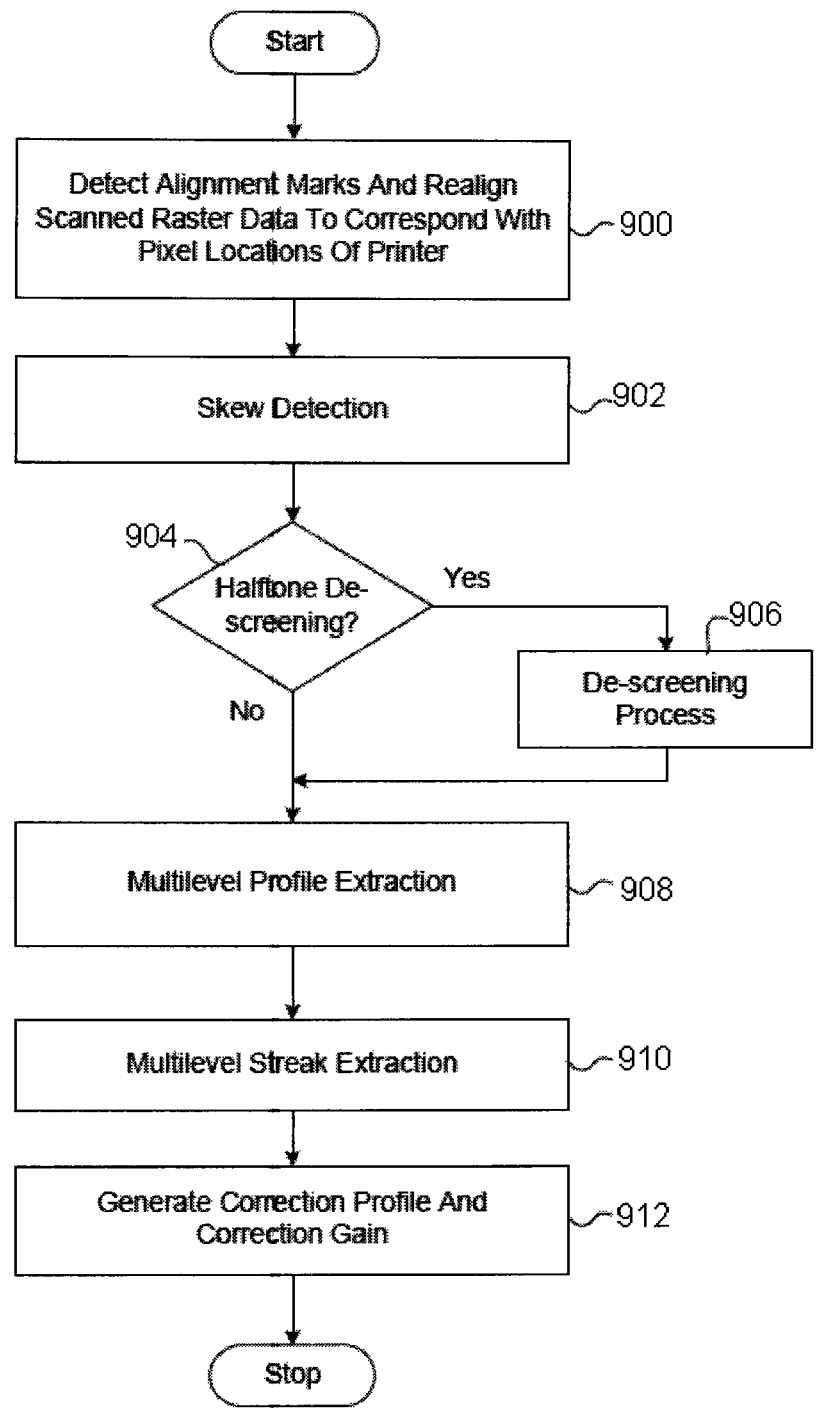
FIG. 9 is a flowchart of a method for block 804 shown in FIG. 8.

Referring now to FIG. 9, there is shown a flowchart of a method for step 804 shown in FIG. 8 in an embodiment. Initially, as shown in step 900, the one or more different types of alignment marks on each printed target are detected and used to realign the raster data from the scanning device to correspond to the pixel locations of the printer. The skew angle is also determined or estimated to determine the optimal density code values for a correction profile (step 902).

Next, at step 904, an optional determination is made as to whether or not a de-screening process is to be performed on the raster data. If so, the process passes to step 906 for a de-screening process. The de-screening process can be implemented as any known conventional de-screening process. By way of example only, the raster image can be input into a Gaussian filter for de-screening.

The method continues at step 908 where a multilevel profile is extracted from the raster data. The raster data is processed by a motion filter based on the estimated skew angle determined at step 902. A multilevel streak extraction is then performed on the raster data at step 910, where a spline function having a non-uniform knot placement is used to model the overall density fluctuations at each density level. Streak signals are the difference between the profiles and the fitted spline curves in an embodiment. Streak signals can be represented in the code-value space and its logarithmic space.

The correction profile and gain are then produced (step 912). The streak signals are decorrelated using a singular value decomposition. The first component is extracted as the correction profile and the remaining signal used to refine the correction profile to better address fine and sharp edges in an embodiment.

The correction gain is produced by linearly fitting the streak signal on the extracted correction profile in the logarithmic space. The slope is used as the correction gain coefficient.

The following description details one technique for deterministically correcting for a one-dimensional non-uniformity by modifying its digital writing module. There are two ways of producing grayscale and color images on reflective substrates: continuous-tone (contone) and halftone. The color mixing theory that explains how light interacts with the substrate and colorant is slightly different between the two. For example, the Yule-Nielsen model is designed for a halftone printing process, and the Beer-Bouguer law assumes a homogeneous medium, and the light absorbed by the medium is proportional to its intensity. If Ds is the reflection density of a solid patch, the Yule-Nielsen model relates the halftone dot area, $A_h$, and the measured reflection density, D, on a halftoned patch as follows:

$$A_h = \frac{1 - 10^{-\frac{D}{n}}}{1 - 10^{-\frac{Ds}{n}}} \quad (1)$$

where n is determined by the actual printing process. In the Beer-Bouguer law, D is a linear function of colorant concentration, c, absorption coefficient, $K(\lambda)$, and total length of light path, w, inside the colorant:

$$D = \frac{1}{2.3026} K(\lambda) w c \quad (2)$$

As a result, non-uniformity in reflection density, $\Delta D$, on a halftone print sample is caused by the variation in the dot area, $\Delta A$. The non-uniformity in reflection density, $\Delta D$, on a continuous-tone print sample is caused by the differential length in light path, $\Delta w$, assuming colorant concentration, c, is uniform. Because it is always possible to calibrate the dot area $A_h \rightarrow \tilde{A}_h$ the limiting case of $n \rightarrow \infty$ can be used to simplify the Yule-Nielsen model as noted in Equation (1) to:

$$\tilde{A}_h = \frac{D}{D_s} \quad (3)$$

As a result, $\Delta D$ is linearly correlated with $\Delta \tilde{A}_h$ in the halftone printing process, and with $\Delta w$ in the continuous-tone printing process. Thus, without loss of generality, the analysis is focused on the halftone imaging process.

Let r be the radius of each halftone dot, and $\tilde{A}_h = \Pi r^2$. One unknown disturbance, $\Theta_i$, in the printing system drives the printing system from its intended location in a color space, for instance reflection density $D_i$, at location $x_i$. $\Theta_i$ results in small variation $\delta r_i$ in the radius, $r_i$, of the halftone dot at $x_i$. That is:

$$r_i \rightarrow r_i + \delta r_i \quad (4)$$

where $\pm r_i$ is a function of $r_i$. Based on the Taylor expansion, $\pm r_i$ can be expressed as follows:

$$\delta r_i(r_i) = \sum_{k=0}^{\infty} \alpha_{ik} r_i^k \quad (5)$$

and $\{\alpha_{ik}\}_{k=0}^{\infty}$ is determined by $\Theta i$. When $\delta r_i$ is small, the following equations are derived based on Equation (3):

$$\Delta D_i = D_s \Delta \tilde{A}_h = D_s 2\pi r_i \delta r_i = \sum_{k=0}^{\infty} (2\pi D_s \alpha_{ik}) r_i^{k=1} \quad (6)$$

In one embodiment, ±r is assumed to be proportional to the current radius r as noted below:

$$\delta r_i = \alpha_{i1} r_i \quad (7)$$

Under this assumption, Equation (6) simplifies to:

$$\Delta D_i = 2\pi D_s \alpha_{i1} r_i^2 = 2 D_s \alpha_{i1} \tilde{A}_h \quad (8)$$

According to Equation (8), the magnitude of the streak signal $\Delta D_i$ at location $x_i$ is linearly increasing with respect to the linearized colorant area coverage $\tilde{A}_{hi}$. Let $\vec{\phi}_j$ and $\vec{\alpha}$ be the estimated reflection density variation and the corresponding streak coefficient perpendicular to the direction of the streak or band across the full range at averaged colorant coverage $A_{hj}$, where $j=1,\ldots,J$. Estimating $\vec{\alpha}$ from single realization of $\vec{\phi}_j$ is very noisy and unreliable, which will results in inferior compensation parameter for the digital writing module. This problem can be greatly alleviated by correlating estimated reflection variation at multiple density levels as follows:

$$\Phi = [\phi_1 \phi_2 \ldots \phi_J] = 2 D_s [A_{h1} A_{h2} \ldots A_{hJ}] \vec{\alpha} \quad (9)$$

Equation (9) indicates that the dimensionality of $\Phi$ is 1, and the remaining J-1 dimensions are the null space composed by measurement/printing noise. As a result, $\vec{\alpha} = |\alpha| \eta$ where $\eta$ is the first singular vector of $\Phi$. At last, by projecting $\Phi$ and $\alpha$ onto $\eta$, Equation (9) can be simplified as follows:

$$|\phi| = 2 D_s |\alpha| A_h = m_h A_h \quad (10)$$

Thus, $|\alpha|$ is proportional to the estimated slope, $m_h$, in Equation (10). This analysis can be further extended when $\alpha$ is a function of r. Assuming the thickness of the colorant layer is fixed before multiple layers of colorant are formed on the substrate, $\tilde{A}_{hi}$ is proportional to M/A, which represents the colorant mass per unit area. M/A can be controlled by the digital writing module. For example, the theoretical analysis on the electrophotography using conductive magnetic brush development can be approximated in first order by the following equation (11):

$$A_h \propto \frac{M}{A} = \frac{C_t v V p}{Q/M} \frac{\rho_c}{\rho_t} \frac{8\varepsilon_0}{r_t} = \alpha_D V = \alpha_D \Gamma(\bar{\omega}) \quad (11)$$

where $C_t$ is the toner concentration, v is the speed ratio factor between roller and photoreceptor, V is the applied voltage, p represents carrier surface packing, Q/M is the charge to mass ratio, $\rho_c$ and $\rho_t$ are the densities of carrier and toner respectively, $\epsilon_0$ is the permittivity of free space, and $r_t$ stands for the toner radius. $\Gamma(\bar{\omega})$ is the mapping function from the power of the digital writing module, $\bar{\omega}$, to the applied voltage, V, on the photoreceptor. As a result, the following relationship can be derived:

$$\frac{\Delta A_h}{A_h} = \frac{2\delta r}{r} = 2\alpha \propto \frac{\delta V}{V} = \frac{\delta \Gamma(\bar{\omega})}{\Gamma(\bar{\omega})} \quad (12)$$

Equation (12) summarizes the theoretical basis to deterministically correcting a one-dimensional non-uniformity by modifying its digital writing module.

In various embodiments, step 912 also includes adjusting the compensation data according to the halftone screen selected, as described above.

Figure 10:
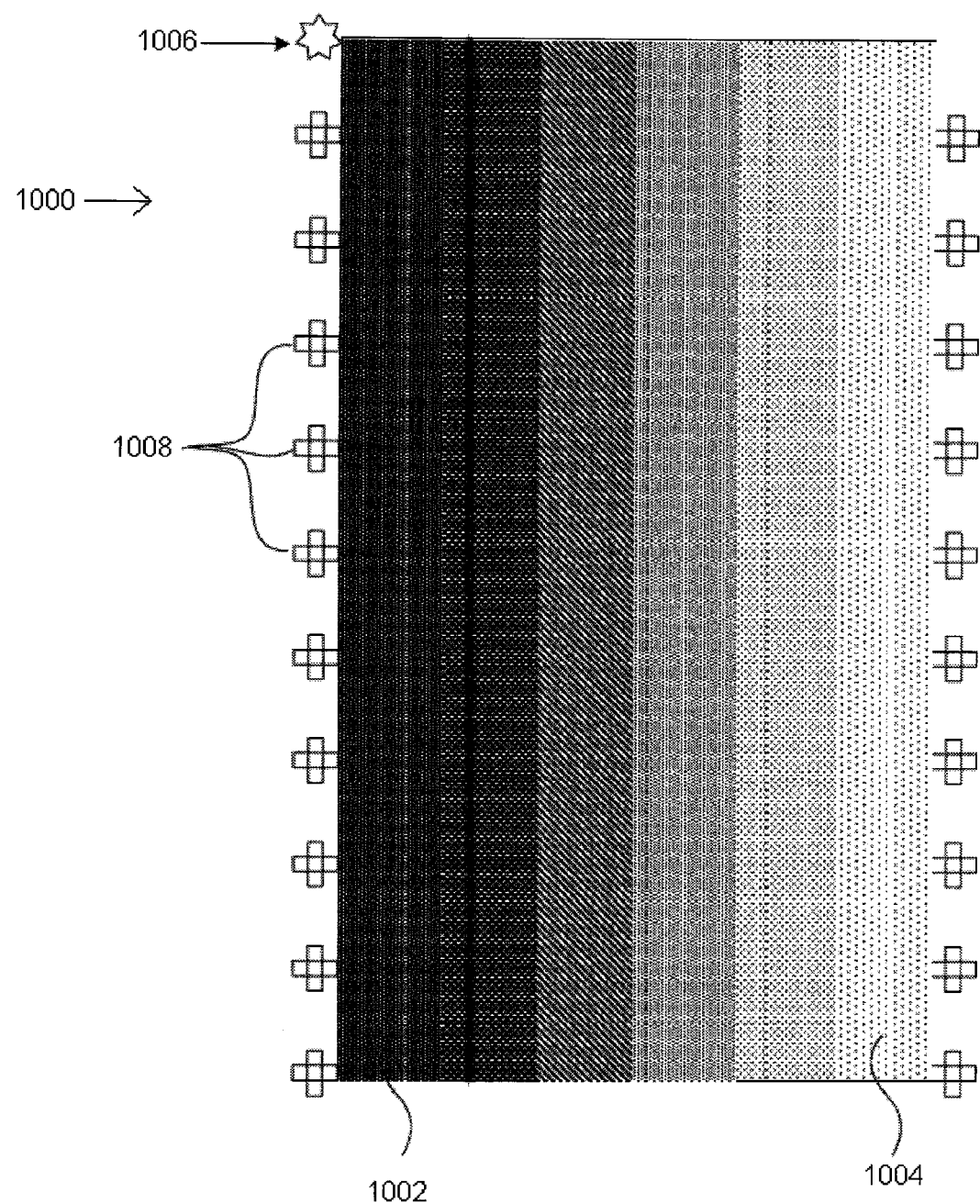
FIG. 10 is a graphical representation of a test target having enlarged alignment marks.

FIG. 10 is a graphical illustration of a target having enlarged alignment marks according to various embodiments. As shown, target 1000 includes multiple uniform density images and two different types of alignment marks. The uniform density images vary in tone from a darker tone uniform density image 1002 to a lighter tone uniform density image 1004. Alignment marks 1006, 1008 (shown enlarged for easier visibility) are used to correlate the location of the printed mark to a pixel location from the exposure subsystem 22 (FIG. 1). If the exposure device is an LED printhead, the alignment marks can be used to locate the exact LED array locations on the printhead. The correction can be tuned for any one of the given tone densities. For example, in one embodiment, the correction is tuned for a mid-tone density.

The invention is inclusive of combinations of the embodiments described herein. References to "a particular embodiment" and the like refer to features that are present in at least one embodiment of the invention. Separate references to "an embodiment" or "particular embodiments" or the like do not necessarily refer to the same embodiment or embodiments; however, such embodiments are not mutually exclusive, unless so indicated or as are readily apparent to one of skill in the art. The use of singular or plural in referring to the "method" or "methods" and the like is not limiting. The word "or" is used in this disclosure in a non-exclusive sense, unless otherwise explicitly noted.

The invention has been described in detail with particular reference to certain preferred embodiments thereof, but it will be understood that variations, combinations, and modifications can be effected by a person of ordinary skill in the art within the spirit and scope of the invention.

PARTS LIST 21 charger
21a voltage source
22 exposure subsystem
23 toning station
23a voltage source
25 photoreceptor
25a voltage source
31, 32, 33, 34, 35, 36 printing module
38 print image
39 fused image
40 supply unit
42, 42A, 42B receiver
50 transfer subsystem
60 fuser
62 fusing roller
64 pressure roller
66 fusing nip
68 release fluid application substation
69 output tray
70 finisher
81 transport web
86 cleaning station
99 logic and control unit (LCU)
100 printer
200 input pixel levels
205 workflow inputs
210 image-processing path
216 optional non-aggressive UCR or GCR unit
217 clear-toner processing unit
220 output pixel levels 250 screening unit
260 screened pixel levels
262 compensation unit
265 engine pixel levels
270 print engine
310 data-processing system
320 peripheral system
330 user-interface system
340 data-storage system
402 scanning device
412 memory
439 fused image
442 receiver
486 processor
510 provide printer step
515 provide gain control signals step
520 receive print job step
522 determine key step
525 adjust gain control signals step
530 modify screened pixel levels in print job step
535 expose photoreceptor step
610 provide print head step
615 select test target step
620 scan test target step
625 produce adjusted gain control signals step
630 more screens in the group? decision step
710 provide print head step
715 select test target step
720 scan test target step
725 produce adjusted gain control signals for selected screen step
730 receive screen correlation factor for other screen step
735 produce adjusted gain control signals for other screen step
800 print target step
802 rotate and scan step
804 analyze step
806 store profile step
900 detect and realign step
902 skew-detection step
904 halftone de-screening decision step
906 de-screening step
908 profile extraction step
910 streak extraction step
912 produce profile and gain step
1000 target
1002 darker tone uniform density image
1004 lighter tone uniform density image
1006, 1008 alignment mark

The invention claimed is:

1. A method of compensating for nonuniformity in a printer, comprising:
providing the printer having a photoreceptor and a print head with a plurality of different light sources, each light source capable of producing a plurality of different levels of light;
providing a plurality of stored gain control signals for each light source based upon the light output of that light source;
receiving data for a print job, the data including screened pixel levels and a halftone screen specification;
determining a print job key by analyzing a histogram of image content for the print job to classify the print job as high-key, low-key or normal key;
adjusting the stored gain control signals based on the halftone screen specification and the determined print job key;
modifying the screened pixel levels using the adjusted gain control signals to provide engine pixel levels;
providing the engine pixel levels to corresponding light sources to expose the photoreceptor in respective pixel areas with light corresponding to the compensated pixel levels.

2. The method according to claim 1, wherein the adjusting step includes looking up the adjusted gain control signals in a lookup table indexed by the halftone screen specification.

3. The method according to claim 2, wherein the lookup table is further indexed by the determined print job key.

4. The method according to claim 1, wherein each light source is a light emitting diode (LED) and the printer is an electrophotographic printer.

\* \* \* \* \*